Sept. 2, 1969    NORIOMI OCHIAI    3,465,362
SHELL-TYPE LUNEBERG LENS

Filed July 13, 1966    4 Sheets-Sheet 1

INVENTOR.
Noriomi Ochiai

BY [signature] ATTORNEYS

INVENTOR.
Noriomi Ochiai

United States Patent Office 3,465,362
Patented Sept. 2, 1969

3,465,362
SHELL-TYPE LUNEBERG LENS
Noriomi Ochiai, Tokyo, Japan, assignor to Kabushikikaisha Tokyo Keiki Seizosho (Tokyo Keiki Seizosho Co., Ltd.), Tokyo, Japan, a corporation of Japan
Filed July 13, 1966, Ser. No. 564,769
Claims priority, application Japan, July 17, 1965, 40/43,297
Int. Cl. H01q 15/08
U.S. Cl. 343—911                     3 Claims

ABSTRACT OF THE DISCLOSURE

A spherical dielectric lens having a homogeneous spherical core and a plurality of outer layers surrounding the core substantially concentrically therewith, the dielectric constant of the core being determined in accordance with the diameter of the outermost layer of the outer layers, the ratio of the diameter of the core to the diameter of the outermost layer and the shortest wave length of waves to be used, the dielectric constant of each of the outer layers being determined by Luneberg lens equation, and the radius of the core exceeding 40% of the radius of the spherical lens.

---

This invention relates to a spherical dielectric lens and a method of the manufacture of the same. Particularly, the present invention resides in the provision of a novel spherical dielectric lens which comprises a homogeneous dielectric sphere of a diameter in excess of about 40% of that of the spherical dielectric lens and a plurality of spherical outer layers enclosing the homogeneous dielectric sphere which are the same as those employed in a conventional Luneberg lens.

The Luneberg lens has heretofore been employed in the art but its fabrication requires many complicated processes. Therefore, it has been highly desired to realize spherical dielectric lens which can be produced with less manufacturing processes.

Accordingly, it is one object of this invention to provide a spherical dielectric lens which is easy to produce but substantially the same in performance, appearance, size, weight and so on as the Luneberg lens.

It is another object of this invention to provide a spherical dielectric lens antenna which is easy to produce.

It is still another object of this invention to provide a dielectric lens reflector which is simple in construction and usable as a radar reflector with an attachment of a metallic reflector along one portion of the spherical surface of the lens.

It is still a further object of this invention to provide a method of the manufacture of a spherical dielectric lens which requires few manufacturing processes.

Other objects, features and advantages of this invention will become apparent from the following description taken in conjunction with the accompanying drawings, in which.

In order to facilitate a better understanding of the present invention, a description will be given in connection with the Luneberg lens heretofore employed in the art.

Figure 1:
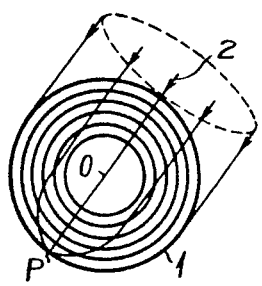
FIGURE 1 is an explanatory diagram of the operation of a conventional Luneberg lens.

As illustrated in FIGURE 1, the Luneberg lens is a sphere 1 composed of a dielectric substance, which comprises a plurality of spherical shell layers and whose specific dielectric constant increases as the center of the lens is approached. That is, the specific dielectric constant K of each layer is a function solely of the distance r from the center of the lens or the radius of the layer. The specific dielectric constant K is given by the so-called Luneberg equation as follows:

$$K = 2 - \left(\frac{r}{R}\right)^2 \quad (1)$$

where R is the outermost radius of the Luneberg lens.

The Luneberg lens focuses electromagnetic waves on two points, one of which is positioned on the outer spherical surface of the lens and the other of which is positioned at an infinite-point from the lens. Accordingly, plane waves 2 (regarded as electromagnetic waves emitted from the infinite-point) which enter the lens are gradually refracted to be focused to a point P or the aforementioned focus on the spherical surface of the lens diametrically opposite the source, as illustrated in FIGURE 1 by arrows. When the waves enter the lens from an electromagnetic horn mounted thereon at the point P, the waves having passed through the lens become plane waves in accordance with the principle of reciprocity of light-path. In this manner, the Luneberg lens can be utilized as an antenna.

Figure 2:
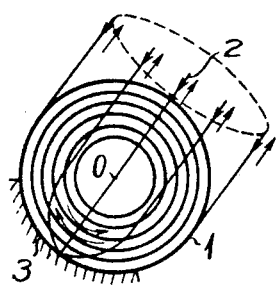
FIGURE 2 is an explanatory diagram of a conventional Luneberg lens having mounted thereon means having a metallic surface serving as a reflector.

Further, with the provision of a circular metal plate 3 conforming to the spherical surface of the lens 1, plane waves K having entered the lens 1 from the opposite side from the metal plate 3 are focused to a point on the spherical surface of the lens diametrically opposite the source and then they are reflected by the metal plate 3 back in the same direction in which they came, as illustrated in FIGURE 2. Thus, the Luneberg lens can be used as a wide-angle radar reflector.

Recently the Luneberg lens has been gradually put to practical use as a radar reflector or an antenna. However, the manufacture of the Luneberg lens requires many complicated processes and high precision as will be described later, so that the production cost of the lens is inevitably high.

Figure 3:
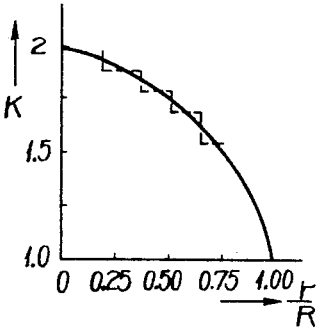
FIGURE 3 is a graph illustrating the relationship between the radius of the Luneberg lens and the specific dielectric constant thereof.

The Luneberg Equation 1 can be represented in the form of a parabola as illustrated in FIGURE 3. It is very difficult in practice to make a spherical dielectric lens whose specific dielectric constant varies continuously, and hence a method is adopted such that the specific dielectric constant of the lens is varied in a stepwise manner as indicated by the broken line in the figure. In this case, the thickness of each layer having the same specific dielectric constant is required to be less than one half of the wavelength of a wave which enters the lens. If the thickness of the layer is greater than one half of the wavelength of the wave, the so-called "wave trapping" phenomenon is caused such that one portion of the wave having entered the lens is propagated in the same layer while being reflected by the demarcation planes of adjacent layers, which results in loss. To avoid this, it is the practice to select the thickness of each layer to be less than a quarter of the shortest wavelength used. However, this requirement imposes a severe limitation on the construction of the lens. That is, a lens having a diameter of 7.6 cm. for use with the X band (a region of a wavelength of 3 cm.) usually comprises more than ten layers and a lens having a diameter of 30.5 cm. employs more than twenty layers. Further, the tolerance of the specific dielectric constant of each layer is required to be held within ±0.02. Hence, the manufacture of the Luneberg lens involves many complicated processes which must be carried out with high precision, so that the conventional Luneberg lens is inevitably expensive.

In order to remove such a limitation imposed on the production of the conventional lenses, various studies have heretofore been made but fully satisfactory lens has not been realized up to now. Of the conventional lenses a homogeneous dielectric lens is the most preferred one, with which, however, some problems are encountered. This homogeneous dielectric lens has not been successfully put to practical use.

Figure 4:
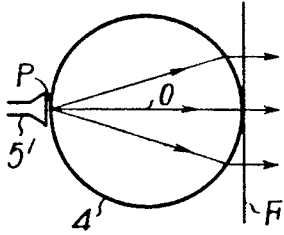
FIGURE 4 is an explanatory diagram of the operation of a homogeneous dielectric lens of a spherical shape studied in the art.
Figure 5:
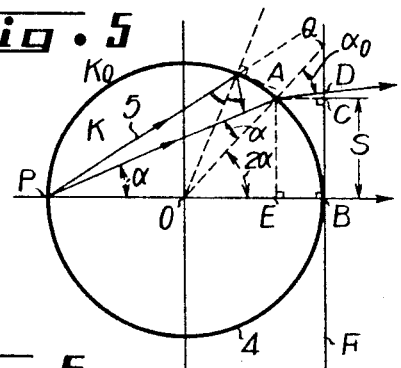
FIGURE 5 is a diagram showing the relationship among the refraction, reflection and phase of an electromagnetic wave through the homogeneous spherical dielectric lens.

In FIGURE 4 there is schematically illustrated such a homogeneous dielectric lens of a spherical shape, as indicated at reference numeral 4, which has a homogeneous specific dielectric constant. Since the specific dielectric constant is the same throughout the lens 4, an electromagnetic wave which enters the lens 4 from a point P on the spherical surface thereof through, for example, an electromagnetic horn 5′, is propagated in a straight line as shown in the figure. However, when the wave comes out of the lens 4 it is refracted at the spherical surface of the lens because of a difference in the specific dielectric constants of the lens and the surrounding air. In FIGURE 5 there is illustrated in cross section the spherical dielectric lens 4 along the great circle thereof. The reference character K identifies the specific dielectric constant of the lens 4, $K_0$ the specific dielectric constant of the surrounding air, 0 the center of the lens 4 and F a plane which is tangent to the great circle of the lens at a point B diametrically opposite the point P. In the homogeneous dielectric lens 4, its specific dielectric constant K is selected so that waves having entered the lens 4 from the point P may be arranged in an equiphase plane on the plane F. This will hereinbelow be explained with reference to FIGURE 5.

A description will be given in connection with a wave travelling along the path PAD, and in this case $$<OAP=\alpha$$

and $$<DAQ=\alpha_0$$

where D indicates a point where the wave travelling along the path PA crosses the plane F after being refracted at the point A, and Q designates a point where the extension of OA crosses the plane F. In accordance with the law of refraction the following equation holds true:

$$\frac{\sin \alpha}{\sin \alpha_0}=\frac{\sqrt{K_0}}{\sqrt{K}} \quad (2)$$

The phase difference on the plane F will now be discussed which is caused by the waves passing through the lens 4, the one travelling along the path POB or the diameter PB of the lens and the other along the path PA at an angle of $\alpha$ to the diameter PB. In this case, it is sufficient to consider only the electric path difference of the two waves, because the phase difference can be calculated from the electric path difference multiplied by $2\pi/\lambda$ ($\lambda$: the wavelength of the wave in the air). A perpendicular is drawn to the plane F from the point A and the point of intersection is designated at C. For the phase difference in the plane F, the electric path AD outside of the lens 4 may be replaced by the segment AC in the meaning of approximation.

Accordingly, the electric path difference $\Delta$ of the two waves to the plane F is as follows:

$$\Delta=(\sqrt{K}\ AP+\sqrt{K_0}\ AC)-\sqrt{K}\ PB$$

If the outside of the lens is air, it can be regarded that $K_0\doteqdot 1$, and accordingly the following equation holds true, $$\Delta=\sqrt{K}\ AP+AC-\sqrt{K}\ PB$$
$$=2\sqrt{K}\ R\ \cos\alpha+(R-R\cos 2\alpha)-2\sqrt{K}\ R$$
$$=R\{(1-\cos 2\alpha)-2\sqrt{K}\ (1-\cos\alpha)\}$$

where R is the radius of the lens 4. From the above Equation 3, it appears that $\Delta$ is a function of $\alpha$ and K, if R is constant.

If $BC=S$, S can be given by the following equation:

$$S=R\sin 2\alpha (4)'$$

Figure 6:
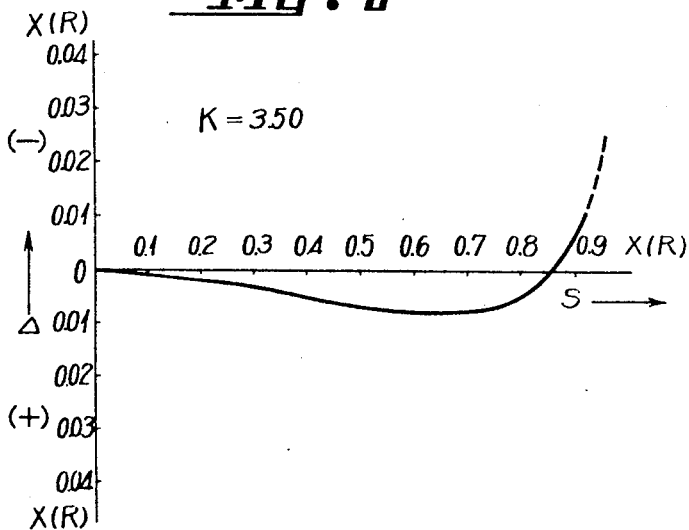
FIGURE 6 is a graph illustrating the distribution of the difference in electric path length along the radius of the homogeneous dielectric lens.

By substituting various values for the incident angle $\alpha$ of a wave in the above Equation 3, the electric path difference $\Delta$ in the plane F between the wave travelling along the diameter of the lens and each of those travelling along various paths can be given. In order that all the waves having reached the plane F may be arranged in an equiphase plane, the specific dielectric constant K of the lens 4 is selected to be such that the aforementioned electric path difference $\Delta$ in the plane F is approximately zero. It is well known that when the specific dielectric constant K is 3.50 the electric path difference $\Delta$ is minimum. In FIGURE 6 there is illustrated the relationship between S and the electric path difference $\Delta$, the abscissa representing the value of S and the ordinate the value of $\Delta$ in terms of R, i.e. the radius of the lens.

When $\alpha_0 \geq 90°$ in the Equation 2, the total reflection phenomenon is caused. That is, the wave having entered the lens does not get out of the lens or it is totally reflected at the boundary plane between the lens and air. Such an incident angle as to cause the refraction angle $\alpha_0$ to be 90 degrees is called a critical angle. All the waves incident on the boundary plane at greater incident angles cause the total reflection. This total reflection phenomenon is illustrated by the electric path 5 in FIGURE 5. Where $K_0=1$, $K=3.50$ and $\alpha_0=90°$ in the Equation 2, it follows that $\alpha=32°20'$, which is the critical angle in this case. Substituting the value of $\alpha$ in the Equation 4′, $S=0.9038R$. This implies that the portion of the lens having a greater value of S does not function as a lens. In the curve of FIGURE 6 the broken line portion indicates such a portion of the lens.

In FIGURE 6 the maximum value of the electric path difference $\Delta$ is 0.0083R. In the case where use is made of a lens having a diameter of 12.7 cm. for use with the X band, $R=3.97\lambda$ and the electric path difference $\Delta$ is $0.033\lambda$ at maximum.

Accordingly, in such a small lens the phase difference does not matter so much. With an increase in the diameter of the lens, however, the phase difference becomes significant together with other problems. The reasons why the homogeneous dielectric lens has not been put to practical use are that a large propagation loss is caused by a high specific dielectric constant, that the lens is heavy, that homogeneity of the specific dielectric constant is highly required and that the effective portion of the lens is decreased by the total reflection to cause a remarkable decrease in the radar cross section when the lens is used as a radar reflector.

The novel spherical dielectric lens of this invention comprises a homogeneous dielectric sphere of a diameter in excess of about 40% of the overall lens diameter, though the percentage is dependent upon the lens diameter and the shortest wavelength to be handled. Suppose that the wavelength to be used is the X band (3.2 cm.). Then, in the case of a lens having a diameter of 12.7 cm., the diameter of the homogeneous dielectric sphere will correspond to approximately 80% of the overall lens diameter, and in the case where a lens having a diameter of 25.4 cm., the diameter of the homogeneous dielectric sphere will correspond to approximately 60% of the lens diameter. In the former case, the thickness of the remaining outer layer portion enclosing the homogeneous dielectric sphere and consisting of spherical shells corresponds to 20% of the lens diameter, each of the spherical shells having a specific dielectric constant as defined according to the Luneberg equation. In the latter case, the thickness of such an outer layer portion corresponds to 40% of the lens diameter. In either case, the specific dielectric constant of the enclosed homogeneous dielectric sphere is selected so that the waves having entered the spherical dielectric lens from one point on the spherical surface thereof may become plane waves (arranged in a equiphase plane) after having passed through the lens.

With such an arrangement, in the present invention the outer layer portion similar to that in the Luneberg lens effects the lens action, thus avoiding the disadvantage experienced in the aforementioned homogeneous dielectric lens such that outer portions corresponding to the cross section of the lens along the great circle thereof do not affect the lens action because of the total reflection of the wave as described with FIGURE 5. Further, the specific dielectric constant of the homogeneous dielectric sphere enclosed by the outer layer is relatively low such as 1.8 or 1.7, as compared with that in the case of the conventional homogeneous dielectric lens. As a result of this, the propagation loss is substantially the same as that in the Luneberg lens.

The spherical dielectric lens of this invention is substantially the same in performance as the conventional Luneberg lens, to say nothing of appearance, size and weight. Further, its fabrication is very easy and requires fewer manufacturing processes than for the Luneberg lens.

The present invention will hereinafter be described in detail.

Figure 7:
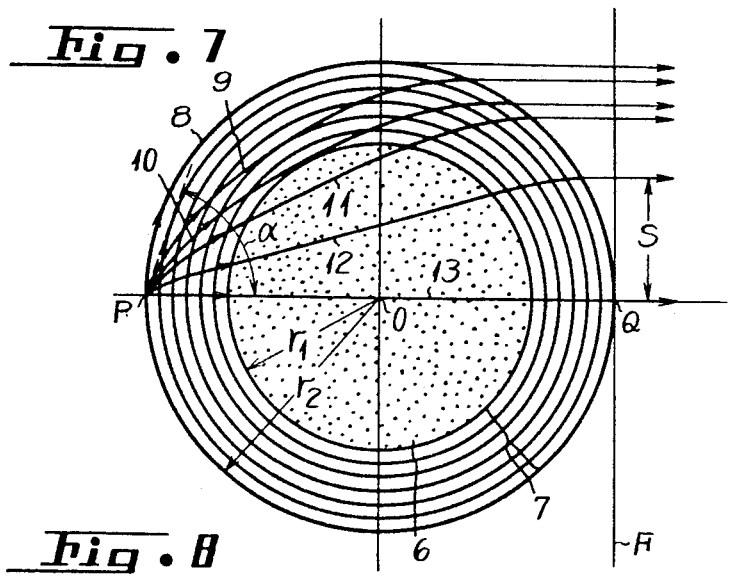
FIGURE 7 is an explanatory diagram of the operation of a novel spherical dielectric lens produced according to this invention.

In FIGURE 7 there is schematically illustrated in cross section the spherical dielectric lens of this invention which comprises a homogeneous dielectric sphere 6 having a diameter $r_1$ and a plurality of spherical outer shell layers made of a dielectric material and surrounding the homogeneous dielectric sphere 6 substantially concentrically therewith, each spherical outer shell layer having a different specific dielectric constant and a diameter in the range from the inner and outer diameters $r_1$ and $r_2$ of the overal lens diameter. The specific dielectric constant K of each spherical outer layer is so selected as to satisfy approximately the equation $$K = 2 - \left(\frac{r}{r_2}\right)^2$$

$r$ being the radius of any desired one of the spherical outer shell layers. The specific dielectric constant of the homogeneous dielectric sphere 6 is selected in accordance with the shortest wavelength to be handled, the size of the spherical dielectric lens and the ratio of $r_1/r_2$, in order that waves having entered the lens from a point P on the spherical surface of the lens may be arranged to be equiphase on a plane F tangent to the outer periphery of the lens at the intersecting point Q of a prolongation of the line OP with the outer periphery of the lens, O indicating the center of the lens. As is clearly seen from the figure, a plurality of spherical shells 7 are assembled about the homogeneous dielectric sphere 6 one on another substantially concentric therewith. The dielectric constants of the respective spherical shells are selected according to the aforementioned Luneberg equation so that the dielectric constant of the finished lens may vary substantially as the center of the lens is approached. Further, the homogeneous dielectric sphere 6 and the spherical shell layers 7 are assembled together into a sphere without producing gaps therebetween through the use of an adhesive binder previously mixed in a dielectric material used. The construction and the method of the manufacture of the dielectric lens will be described in detail, by way of example, in the latter part of this specification.

Of the waves having entered the spherical dielectric lens from the point P, those travelling along paths 8, 9 and 10 pass only the outer layer portion of the lens which corresponds to the spherical shells of the Luneberg lens, so that they perfectly agree with one another in phase in the plane F after having passed through the lens. The path 8 shows a case in which the wave travels along the boundary plane of the outermost spherical shell of the lens corresponding to the Luneberg lens, while the path 10 illustrates a case in which the wave travels along a path tangential to the enclosed homogeneous dielectric sphere 6.

Meanwhile, reference numerals 11, 12 and 13 indicate paths along which the waves pass through both the spherical shells corresponding to the Luneberg lens and the homogeneous dielectric sphere. The wave paths in the homogeneous dielectric sphere and in the surrounding air are straight but they are naturally elliptic in the spherical shell layers as in the Luneberg lens. The reference numeral 13 indicates a specific wave path along the diameter of the lens. The specific dielectric constant of the homogeneous sphere 6 is selected to be such that the waves passing through both the spherical shell layers corresponding to the Luneberg lens and the homogeneous dielectric sphere as indicated by the paths 11, 12 and 13 and those passing through the spherical shell layers only as indicated by the paths 8, 9 and 10 may be equiphase in the plane F.

The waves of the paths 8, 9 and 10 run through the spherical shell layers only, so that they are all equal in phase on the plane F, and further they are also equal in phase to that along the diameter of the Luneberg lens of equal size. Accordingly, the phase variations of these waves transmitted from the point P to the plane F are all equal and given by the following equation.

$$\frac{4\pi}{\lambda} \int_0^{r_2} \sqrt{K}\, dr, \text{ where } K = 2 - \left(\frac{r}{r_2}\right)^2$$

$$= \frac{4\pi}{\lambda r_2} \int_0^{r_2} \sqrt{2r_2^2 - r^2}\, dr$$

$$= \frac{2\pi r_2}{\lambda} \left(\frac{\pi}{2} + 1\right) \quad (4)$$

This result can be also derived immediately from the phase variation of the wave along the particular path 8.

Meanwhile, the phase variations of the waves passing through both the outer shell layers and the homogeneous dielectric sphere can be obtained by computation, though a little complicated. The specific dielectric constant of the homogeneous dielectric sphere is selected in such a manner that the value of the computation may be as equal to that of the Equation 4 as possible.

Figure 8:
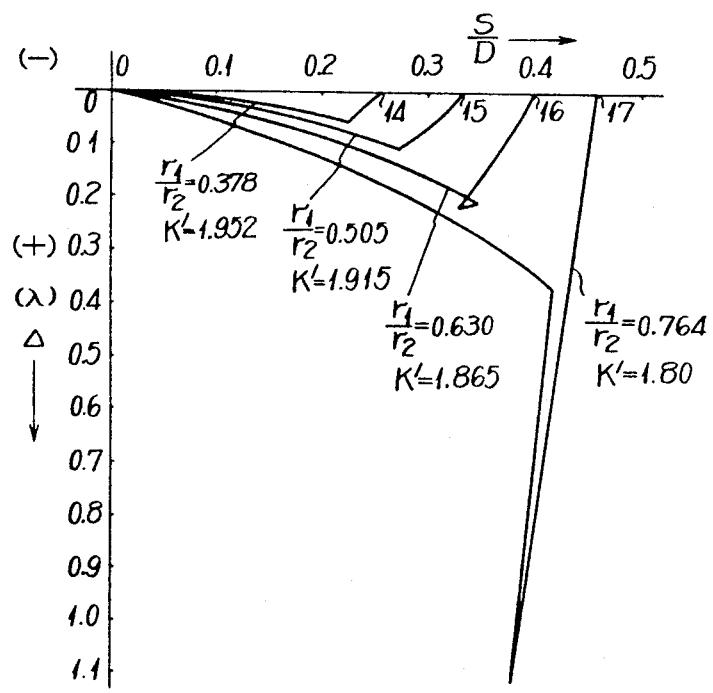
FIGURE 8 is a graph for explaining the manner of choice of the specific dielectric constant of a homogeneous dielectric sphere enclosed in the spherical dielectric lens of this invention.

FIGURE 8 illustrates the relationship between the electric path difference Δ and S/D, the abscissa representing the former and the ordinate the latter. Δ indicates the difference in electric path length between the wave reaching the point Q on the plane F and each of those striking at other points of the plane, S designates the distance from the point Q to the striking point of each wave and D identifies the diameter of the lens. As first step, the specific dielectric constant of the homogeneous dielectric sphere is selected such that the wave travelling diametrically of the lens will be subject to such a phase variation given by the Equation 4. The phase difference is given by multiplication of $\Delta$ by $2\pi/\lambda$ and the reference of the electric path length is $$\left(\frac{\pi}{2}+1\right)r_2$$

given by the Equation 4. In this graph the ratio $r_1/r_2$ is employed as a parameter. The values given in the figure are those results which were obtained by concrete computations with a spherical dielectric lens having a diameter of 25.4 cm. with the shortest wavelength to be handled being of the X band. This graph illustrates four examples of the electric path difference $\Delta$ obtained in the cases where $r_1/r_2$ was 0.378, 0.505, 0.630 and 0.764.

In this case, the specific dielectric constant K' of the homogeneous dielectric sphere is given by the following equation:

$$2\int_{r_1}^{r_2}\sqrt{K}dr+2\sqrt{K'}r_1=r_2\left(\frac{\pi}{2}+1\right) \quad (5)$$

where $r_1$ is the radius of the homogeneous dielectric sphere, K is specific dielectric constant given by the Luneberg equation and $r_2$ the outermost radius of the spherical dielectric lens having enclosed therein the homogeneous dielectric sphere.

With variations in the ratio $r_1/r_2$, the specific dielectric constant K' can be obtained from the Equation 5 as follows:

| $r_1/r_2$: | K' |
|---|---|
| 0.378 | 1.952 |
| 0.505 | 1.915 |
| 0.630 | 1.865 |
| 0.764 | 1.800 |

As is apparent from FIGURE 8, the electric path difference $\Delta$ is approximately zero while the incident angle $\alpha$ of the wave at the point P, namely the ratio $S/D$ is small. However, the electric path difference $\Delta$ increases with an increase in the incident angle $\alpha$ but goes down to zero when the incident angle $\alpha$ exceeds a certain limit value (such as indicated by 14, 15, 16 and 17 in the figure). This is caused in the case where the wave path is in contact with the enclosed homogeneous dielectric sphere as in the case of the path 10 shown in FIGURE 7. The value of S corresponding to the limit value can be derived from the following equation (which can be obtained based on the fact that the locus of the wave in the Luneberg lens is an ellipse).

$$S=\sqrt{2r_1}\sqrt{1-\frac{1}{2}\left(\frac{r_1}{r_2}\right)^2} \quad (6)$$

It appears from FIGURE 8 that if the ratio $r_1/r_2$ is great, the electric path difference $\Delta$ abruptly increases as the incident angle $\alpha$ approaches the limit value. However, S does not increase with an increase in the incident angle $\alpha$ but rather decreases a little while, and further the electric path difference $\Delta$ changes abruptly as illustrated. With a homogeneous dielectric sphere having such a specific dielectric constant, it is difficult to increase the ratio $r_1/r_2$ up to a great value. In addition, it is undesirable in the spherical dielectric lens that the electric path difference $\Delta$ greatly increases with an increase in S and abruptly changes. This is apparent from the fact that the radar cross section of the spherical dielectric lens is in proportion to the square of the spherical cross section of the lens, i.e. the fourth power of the radius of the lens. In this invention it is preferred that the length of the electric path near the center of the lens is shorter than that given by $$\left(\frac{\pi}{2}+1\right)r_2$$

in the Equation 4. In this case the electric path difference $\Delta$ may be made negative. However, in this case, it is more preferred to suppress the increase of the electric path difference $\Delta$ of the electric paths spaced from the center of the lens.

Figure 9:
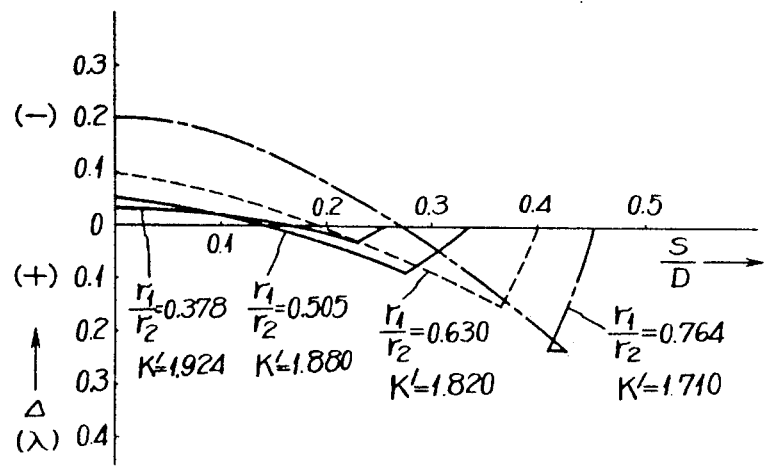
FIGURE 9 is a graph illustrating the relaionship between $S/D$ and $\Delta$ with the ratio $r_1/r_2$ being changed as a parameter and showing the optimum specific dielectric constants of the homogeneous dielectric sphere of the lens, obtainable with each value of the parameter.

In view of the above, by some computations of electric path difference $\Delta$ with the specific dielectric constant K' of the homogeneous dielectric sphere being changed, optimum values of K' are obtained for respective given ratios $r_1/r_2$, as illustrated in FIGURE 9. The graph of this figure shows the relationship between the electric path difference $\Delta$ and the ratio $S/D$ with the ratio $r_1/r_2$ being as a parameter using an optimum value of K', obtained with a lens having a diameter of 25.4 cm. for use with the X band as in the case of FIGURE 8.

Figure 10:
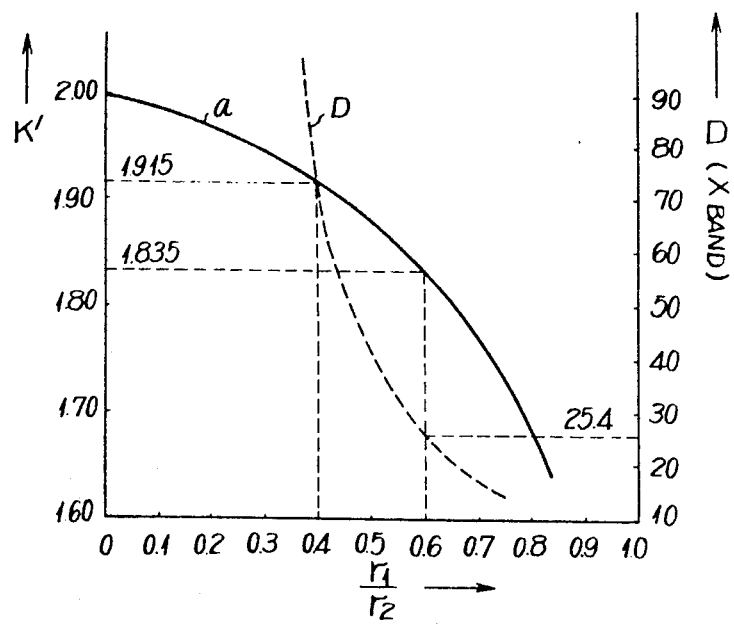
FIGURE 10 is a graph illustrating the relationship between an optimum specific dielectric constant of the homogeneous dielectric sphere and the ratio $r_1/r_2$.

From a comparison of this graph with that of FIGURE 8, it will be seen that the value of the electric path difference $\Delta$ greatly decreases without producing an abrupt change. In FIGURE 10 there is illustrated the relationship between the ratio $r_1/r_2$ and the specific dielectric constant K' of the homogeneous dielectric sphere, obtained by utilizing the results shown in FIGURE 9.

The curve shown in FIGURE 10 can be practically used in the manufacture of the spherical dielectric lens of this invention. That is, the specific dielectric constant K' of the homogeneous dielectric sphere can be determined according to this graph after the ratio $r_1/r_2$ has been determined.

The specific dielectric constant K' is determined in accordance with the value of the ratio $r_1/r_2$ independently of the size of the lens and the wavelength to be handled. With the homogeneous dielectric sphere thus produced, the spherical dielectric lens exhibits excellent characteristics. It goes without saying that the specific dielectric constant K' in this invention is not in conformity with the Luneberg equation. Once the lens diameter and the shortest wavelength to be handled have been determined to what extent the ratio $r_1/r_2$ is used. This can be derived from the results in FIGURE 9.

It is presumed that the phase difference of the waves in the plane F and consequently the electric path difference $\Delta$ may be permitted up to approximately $0.13\lambda$ ($\lambda$: shortest wavelength to be used), though it differs according as the spherical dielectric lens is utilized as an antenna or a radar reflector. Accordingly, it will be understood from FIGURE 9 that in the case where the shortest wavelength to be handled is of the X band, spherical dielectric lenses having diameters of 13.5 cm., 22.6 cm., 40.7 cm. and 100 cm. may be used with the ratio $r_1/r_2$ being 0.764, 0.630. 0.505 and 0.378 respectively. This relationship is indicated by the dotted line in FIGURE 10. Since this curve represents the permissible maximum lens diameter, it is preferred to select the lens diameter to be a little smaller than the value of $r_1/r_2$ indicated by the dotted line in accordance with the use of the lenses. Now, several examples will hereinbelow be described with references to FIGURE 10. With $r_1/r_2$ being 0.40, a lens of any desired diameter can be produced as long as it is used for the X band, and in this case the specific dielectric constant K' of the homogeneous sphere is 1.915. The outer layer portion corresponding to 60% of the radius of the lens are made by assembling a series of spherical shells each having a specific dielectric constant according to the Luneberg equation. In practice, however, it is of course preferred to make the diameter of the homogeneous dielectric sphere as large as possible, for reducing the number of the entire manufacturing operations of the lens. In the making of a lens having a diameter of, for instance, 25.4 cm. the ratio $r_1/r_2$ is 0.60 at maximum and in this case the specific dielectric constant K' of the homogeneous dielectric sphere is 1.835, as clearly seen from FIGURE 10. Accordingly, the outer layer portion corresponding to 40% of the radius of the lens is made by assembling spherical shells each produced according to the Luneberg equation.

In the case where the shortest wavelength to be handled is not in the X band but in the S band (10 cm. wavelength band) or in the L band (23 cm. wavelength band), permissible maximum lens diameters in FIGURE 10 are those multipled by the wavelength ratio to the X band. That is, the diameters in the cases of the S and the L bands are given by multiplying the values of the diameter in the figure by 3.12 and 7.2 respectively. Therefore, the value of the ratio $r_1/r_2$ may be greatly increased with an increase in the wavelength to be handled independently of the lens diameter, and hence the manufacture of the lens becomes easier. The full line curve depicted in FIGURE 10 illustrates the optimum relationship between the ratio $r_1/r_2$ and the specific dielectric constant K' of the homogeneous dielectric sphere in the manufacture of the spherical dielectric lens used in X band. According to the utilization of the lens, however, the tolerance of the specific dielectric constant K' may be up to ±3% in disregard of some degree of reduction in the performance of the lens.

A description will be given in connection with one example of the method of making the spherical dielectric lens according to this invention. In accordance with this invention the spherical dielectric lens comprises a homogeneous dielectric sphere of a radius in excess of 40% of that of the lens and an outer layer portion consisting of a plurality of spherical shells and enclosing the sphere concentrically therewith.

Figure 11A:
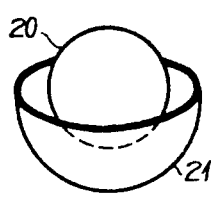
FIGURES 11A and 11B are explanatory diagrams showing a sequence of processes for the manufacture of the spherical dielectric lens according to this invention.
Figure 11B:
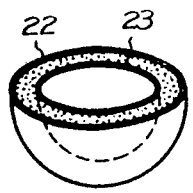

FIGURE 11 illustrates one example of the method of the manufacture of the spherical dielectric lens according to the present invention.

In the first place, a first layer or a spherical core 20 is made in the following manner. That is, plastics foam beads, for example, polystyrene foam beads, are foamed by heating to some extent and thus foamed beads are then assorted, by means of a sieve, into several groups of different particle sizes, so that the foamed beads of each group have the same particle size. Then, some of these groups of the foamed beads are selectively mingled with one another to provide a material having approximately a predetermined specific dielectric constant of the core 20. In other words, the mingling of the foamed beads of different particle sizes is to control the bulk density thereof to provide for a desired specific dielectric constant. Then, an adhesive binder such, for example, as vinyl acetate, is mingled with the dielectric material and is well stirred. The resulting mixture is then moulded into the core 20 by the use of a mould of a desired size. In this case, however, since the adhesion of the vinyl acetate binder is carried out by evaporation of the volatile component in the binder, heating is not required in the moulding. Therefore, the moulding does not cause any variations in the degree of the foaming of the foamed beads present in the mixture. As a result of this, the specific dielectric constant of the core 20 is not adversely affected by the hardening of the mixture during moulding. However, in order to promote the hardening of the mixture, it is possible to heat the mixture packed in the mould at a suitable temperature, for example, 70° C. such that the degree of the foaming or the bulk density of the beads is not caused to vary. According to the method described above, the spherical core 20 is thus produced having a predetermined size and specific dielectric constant. After the making of the spherical core 20, a plurality of outer spherical shell layers are formed on the spherical core 20 one on another. That is, a second layer is first formed on the spherical core 20 in a manner similar to the aforementioned one for the core 20. Namely, plastics foam beads are similarly foamed by heating to some extent but different from that in the core 20.

The formed beads are also assorted, by means of a sieve, into several groups of different particle sizes, (which are different from those of the core 20), so that the formed beads of each group have the same particle size. Then, some of these groups of the formed beads are selectively mingled with one another to provide a material having approximately a predetermined specific dielectric constant of the second layer. Vinyl acetate is added to the material, as an adhesive binder. Then, the resulting mixture is packed into a hemispherical mould for forming the second layer and hardened due to evaporation of the solvent in the binder. In this manner, the second layer having a desired specific dielectric constant is formed integrally with the core 20 concentrically therewith and in substantially uniform thickness. The other outer spherical shell layers are sequentially joined to the layers immediately inside thereof in a similar manner.

Fine adjustment of the dielectric constant of each layer can be accomplished by the addition of grains of titanium dioxide into the mixture of each layer.

Referring to FIGURE 11, the formation of, for example, the second layer will be described more in detail. At first, the spherical core 20 is positioned correctly in the center of a hemispherical mould 21 in a manner so that the spherical surface of the core 20 is spaced a uniform distance from the inner surface of the mould. Then, the mixture for the second layer is packed into the gap between the core 20 and the mould 21 and is moulded into a hemispherical shell covering substantially one half of the core 20. Following this, a similar material for the other half of the second layer is packed into the space between an inner mould 23 and an outer mould 22. Before the material becomes completely solid, the inner mould 23 is removed. The hemispherical shell is pressed from above to be assembled therewith into a sphere. With this method, the second spherical layer is stuck to the spherical core 20 without any gap between the two hemispheres forming the second layer between the core 20 and thus formed second layer. That is, the dielectric material of the core and the second layer are closely joined under the action of the adhesive binder and accordingly no gaps are produced between the core and the second layer, so that substantially no reflection loss due to gap is caused. After the adhesive binder has hardened, the resulting assembly is removed from the mould. The other outer layers are similarly assembled one on another into a spherical dielectric lens.

In the manufacture of the conventional Luneberg lens, the so-called heat fusion method is employed such that a dielectric material for each layer is packed into a mould and heated from the outside. According to this heat fusion method, however, heating and cooling of the material in the mould is not accomplished uniformly throughout the same layer, which results in inequality of the specific dielectric constant in the same layer.

In the present invention all the layers are not required to be formed one after another as has been described in the foregoing. Since the tolerance of the specific dielectric constant of several layers inside of the outermost one is relatively great, the layers made by the conventional heat fusion method can be employed with practically no trouble in actual use. In addition, the use of the heat fusion method in the making of the several outer layers is rather preferred from the viewpoint of increasing the mechanical strength of the spherical dielectric lens.

The particulars of a spherical dielectric lens having a diameter of 25.4 cm. are as given in the following table.

| Layer No. | Radius (mm.) | Specific dielectric constant |
| --- | --- | --- |
| 1 | 64 | [1] 1.88±0.01 |
| 2 | 72 | 1.71±0.02 |
| 3 | 80 | 1.64±0.02 |
| 4 | 88 | 1.56±0.02 |
| 5 | 97 | 1.46±0.02 |
| 6 | 107 | 1.35±0.02 |
| 7 | 117 | 1.22±0.02 |
| 8 | 127 | 1.07±0.02 |

[1] Homogeneous dielectric sphere.
Total weight: 2.70 kg.

This is a spherical dielectric lens designed for the X band as the shortest wavelength. The spherical dielectric lens corresponds to a lens having the ratio $$r_1/r_2 = \frac{64}{127} = 0.505$$

and $K' = 1.88$ in FIGURE 10. As is apparent from this, the number of the layers can be reduced substantially by half, as compared with the conventional Luneberg lens. Further, since some of the outer layers can be produced by the heat foaming method, the manufacturing processes of the lens can be reduced to approximately one-third of those for the Luneberg lens.

Figure 12:
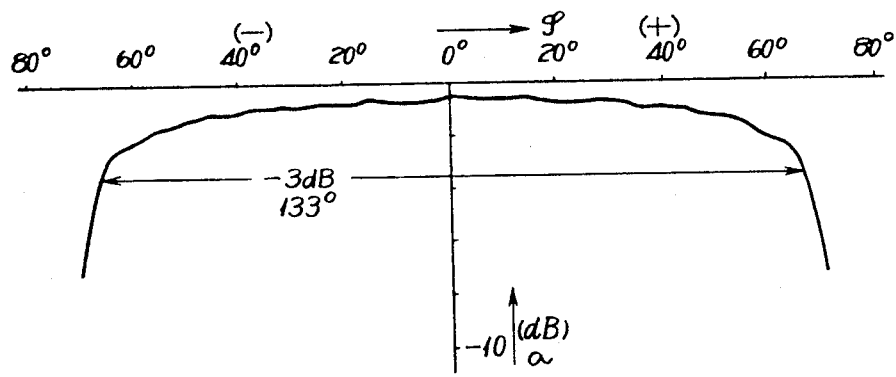
FIGURE 12 is a graph illustrating a characteristic curve of a spherical dielectric lens having a diameter of 25.4 cm. used as a radar reflector for the X band.

FIGURE 12 illustrates one example of the measured values of the spherical dielectric lens used in the X band. This is a case in which the aforementioned spherical dielectric lens having a diameter of 25.4 cm. was used as a radar reflector, providing a cup-shaped metallic reflector having a solid angle of 140 degrees on the spherical surface of the lens. In the graph of this figure the abscissa represents the rotational angle $\psi$ in a horizontal plane and the ordinate the radar cross section $\sigma$ in db. 0 db represents a theoretical value in the case where no loss is assumed. Accordingly, in the case of the X band the theoretical value is 31 m.². It appears from FIGURE 12 that the measured loss due to reduction of the radar cross section is approximately 0.58 db and such a value is equal to or less than that (within 2.0 db) obtainable with the conventional Luneberg lens. The size and weight of the lens of this invention are substantially the same as those of the Luneberg lens, and further the manufacturing processes can be reduced to one-third of those for the Luneberg lens, as described above.

Figure 13:
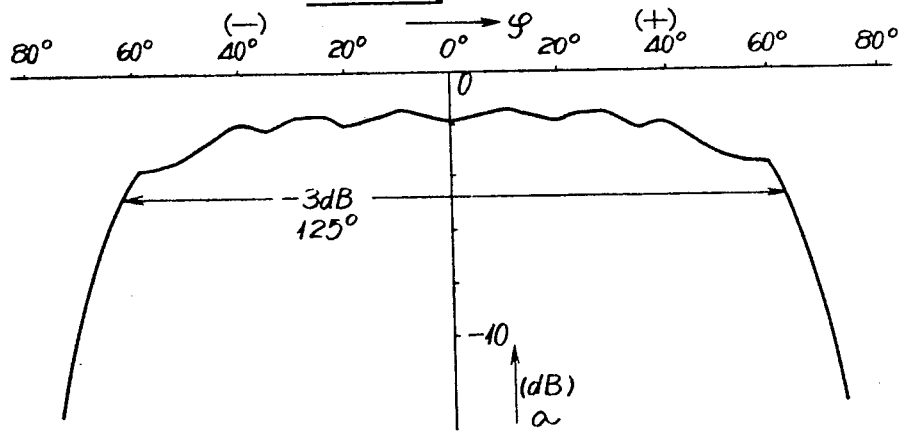
FIGURE 13 is a graph, similar to FIGURE 12, illustrating a characteristic curve obtained with a lens having a diameter of 12.7 cm.

In FIGURE 13 there is illustrated another example of the measured values in the X band in the case where a spherical dielectric lens having a diameter of 12.7 cm. was similarly used as a radar reflector, providing on the spherical surface of the lens a cup-shaped metallic reflector having a solid angle of 140 degrees. In this spherical dielectric lens the ratio $r_1/r_2$ is 0.764 and the specific dielectric constant $K'$ of the homogeneous dielectric sphere 1.710. This lens is very simple in structure such that the homogeneous dielectric sphere is enclosed by only two outer layers having specific dielectric constants K of 1.34 and 1.12 respectively. This graph shows that loss due to reduction of the radar cross section is 1.50 db at most, which is by no means inferior to that in the conventional Luneberg lens. In addition, its size and weight are substantially equal to those of the Luneberg lens. In view of the foregoing, in the case of the aforementioned spherical dielectric lens having a diameter of 25.4 cm., the lens can be composed of four layers including the homogeneous dielectric sphere by increasing the value of the ratio $r_1/r_2$ from 0.505 to 0.60 and selecting the specific dielectric constant $K'$ to be 1.836 and by selecting suitably the thickness of the outer layers.

It will be apparent that many modifications and variations may be effected without departing from the scope of the novel concepts of this invention.

What I claim is:

1. A spherical dielectric lens comprising a spherical core made of a homogeneous dielectric material and a plurality of spherical outer layers made of a dielectric material and surrounding the spherical core substantially concentrically therewith, each of the spherical outer layers having a specific dielectric constant approximately determined by the equation $$K = 2 - \left(\frac{r}{R}\right)^2$$

K being the specific dielectric constant of each spherical outer layer, r being a radius of each outer layer, and R being the radius of the spherical dielectric lens, the spherical core having a radius exceeding 50% of the radius of the spherical dielectric lens, and the specific dielectric constant of the spherical core being selected in accordance with the equation $$2\int_{r_1}^{r_2} \sqrt{K} dr + 2\sqrt{K'}\, r_1 = r_2\left(\frac{\pi}{2} + 1\right)$$

where $r_1$ is the radius of the homogeneous dielectric sphere, K is specific dielectric constant given by the Luneberg equation and $r_2$ the outermost radius of the spherical dielectric lens having enclosed therein the homogeneous dielectric sphere, whereby waves having entered the spherical dielectric lens from one point on the surface thereof may be substantially plane waves on the plane tangential to the point symmetrical with said one point with respect to the center of the spherical dielectric lens after having passed through the spherical dielectric lens.

2. A spherical dielectric lens in accordance with claim 1, wherein a cap-shaped reflector is provided along one portion of the spherical surface of the spherical dielectric lens.

3. A spherical dielectric lens in accordance with claim 2 wherein said cap-shaped reflector is made of metal.

References Cited

UNITED STATES PATENTS

| | | | |
|---|---|---|---|
| 2,849,713 | 8/1958 | Robinson | 343—911 |
| 3,145,382 | 8/1964 | Cuming et al. | 343—911 |

ELI LIEBERMAN, Primary Examiner